United States Patent [19]

Kogan et al.

[11] Patent Number: 4,534,175
[45] Date of Patent: Aug. 13, 1985

[54] METHOD AND APPARATUS FOR THE ABSORPTION OF A GAS IN A LIQUID AND THEIR USE IN ENERGY CONVERSION CYCLES

[75] Inventors: Abraham Kogan, Haifa; Uri Moore, Ramat-Hasharon, both of Israel

[73] Assignee: Gason Energy Engineering Ltd., Tel-Aviv, Israel

[21] Appl. No.: 473,133

[22] Filed: Mar. 7, 1983

[30] Foreign Application Priority Data

Mar. 11, 1982 [IL] Israel ........................................ 65223
Dec. 1, 1982 [IL] Israel ........................................ 67389

[51] Int. Cl.³ .............................................. F01K 25/06
[52] U.S. Cl. ........................................ 60/649; 60/673; 261/114 R
[58] Field of Search ................... 261/148, 153, 114 R; 62/494; 60/649, 673

[56] References Cited

U.S. PATENT DOCUMENTS

| 600,159 | 3/1898 | Mixer | 261/148 |
|---|---|---|---|
| 2,150,452 | 3/1939 | Morse | 261/153 X |
| 4,295,335 | 10/1981 | Brinkerhoff | 60/673 |

FOREIGN PATENT DOCUMENTS 551545 1/1958 Canada ........................... 261/148

Primary Examiner—Stephen F. Husar
Attorney, Agent, or Firm—Browdy and Neimark

[57] ABSTRACT

Method and multiple-stage absorber for effecting gradual absorption of a gas in a solvent under controlled conditions so as to obtain a high-enthalpy solution of the gas in the solvent with maximum recuperation of the heat of absorption. This is achieved by passing the solvent and the gas in respectively opposite directions through a plurality of discrete absorption stages so as to form a relatively concentrated solution and recirculating this solution through some or all of said absorption stages, counter-currently to the flow of the solvent, so as to extract heat from some or all of said stages by indirect heat exchange with the fluid in said stages; and extracting additional amounts of heat from some or all of said absorption stages by indirect heat exchange with a coolant fluid which is passed through said stages.

There is further provided an energy conversion process utilizing a dual fluid system, wherein the absorption of the working fluid vapors in the carrier fluid, is conducted in accordance with the above method of the invention.

23 Claims, 7 Drawing Figures

METHOD AND APPARATUS FOR THE ABSORPTION OF A GAS IN A LIQUID AND THEIR USE IN ENERGY CONVERSION CYCLES

FIELD OF THE INVENTION

This invention concerns the absorption of a gas in a liquid and energy conversion cycles incorporating said method and apparatus. More particularly, one aspect of the invention provides a method and apparatus for effecting absorption of a first fluid having a relatively low boiling point in a second fluid having a considerably higher boiling point than the first fluid, the second fluid having a relatively high degree of absorptivity for the first fluid and constituting a solvent therefor. The first and second fluids will hereinafter be referred to as "gas" (or "solute gas") and "solvent", respectively. The term "liquid" will be used herein to refer both to the solvent in a relatively pure state and to a solution of the gas in the solvent.

BACKGROUND OF THE INVENTION

The task of absorbing a gas in a liquid is encountered in numerous and diverse fields of technology. The present invention is specifically concerned with those gas-liquid absorption processes which are highly exothermic and wherein it is desired to obtain a high-enthalpy solution of the gas in the solvent or a mixture of such a solution with the gas and at the same time to recuperate for further utilization as much as possible of the heat of absorption generated in the process of the absorption of the gas by the solvent.

Examples of technological fields including gas-liquid absorption processes with the above requirements are, typically, the so-called "dual fluid energy conversion systems" or "absorption engines" employing, e.g. ammonia as the gas (or "working fluid") and water as the solvent (or "carrier fluid"). Among the large number of long-standing proposals for such dual fluid energy conversion systems there should be mentioned, for example, U.S. Pat. Nos. 212,037, 337,371, 427.398, 493,722, 1,957,893 and 3,505,810 and British Patent No. 294,882. Whilst all these publications propose the use of an ammonia solution, with the gaseous ammonia produced in a boiler designed to drive an engine and to be subsequently reabsorbed in an aqueous carrier fluid and recycled to the boiler, in all cases the proposed conditions of operation are either clearly inoperable or indicate a very low thermal efficiency.

Attention should also be directed to the more recent U.S. Pat. Nos. 4,195,485, 4,295,335 and 4,307,572 all to Brinkerhoff who discloses the use of dual fluid systems in energy conversion cycles and directs himself specifically to utilizing internal heat sources in the cycle. To this end he proposes, inter alia, the recovery and use of at least part of the heat of absorption generated in an absorber wherein the working fluid vapour, after having produced work, is absorbed in the carrier fluid. Brinkerhoff, however, same as all the other aforementioned references, does not concern himself with the conditions which must obtain in the absorber and in the fluids which flow therethrough in order to ensure a continuous, efficient absorption of the gas in the liquid and recover as much as possible of the generated heat of absorption.

OBJECTS AND BRIEF SUMMARY OF THE INVENTION

It is an object of the present invention to provide a new and improved method for absorbing a gas in a solvent under controlled conditions so as to obtain a high enthalpy solution of the gas in the solvent, or a mixture of such a solution with the gas, and at the same time recuperate as much as possible of the heat of absorption.

A further object of the present invention is to provide a method for gradually absorbing a gas in a solvent in consecutive stages, the absorption process in each stage being effected under conditions as close as possible to thermodynamically reversible conditions.

Yet another object of the present invention is to provide an improved apparatus for carrying out the aforesaid method.

It is yet a further object of the invention to provide a new and improved energy conversion process utilizing a dual fluid system of the above described type wherein the absorption of the working fluid vapour in the carrier fluid is conducted in accordance with the novel method of the present invention.

In accordance with one aspect of the present invention there is thus provided a method of effecting gradual absorption of a gas (as herein defined) in a solvent (as herein defined) under conditions as close as possible to thermodynamically reversible conditions, with maximal recovery of the released heat of absorption, so as to obtain a high-enthalpy solution or mixture of solution and gas at relatively high temperature and pressure, characterized in that a flow of the gas and a flow of the solvent or a weak solution of the gas in the solvent are passed in counter-current through a plurality of discrete stages in each of which intimate contact is established between the gas and the solvent or solution; and in that heat is extracted from some or all of said stages by indirect heat exchange between the fluids in these stages and a strong solution of the gas in the solvent which is withdrawn from one terminal stage and recirculated via a continuous conduit counter-current to the flow of the weak solution and cocurrently with the flow of said gas, through some or all of the stages so as to emerge from said conduit, after passing said stages, as a high-enthalpy solution or mixture of solution and gas; and additional amounts of heat are extracted from some or all of said stages by indirect heat exchange between the fluids in those stages and a coolant fluid or fluids being passed through some or all of said stages, the temperature of said coolant fluid being thus raised.

In accordance with the method of the invention the temperature and pressure parameters in each absorption stage, or in some of the stages, are controlled for optimal operation of the system. Such control is achieved, inter alia, by submitting the liquid in a stage, or during passage of the liquid from one stage to the next one, to indirect heat exchange with a coolant fluid. The heat thus withdrawn from the absorber system by said coolant fluid, may be further utilized within the system or as the heat input of one or more secondary processes. It should be noted that in accordance with this feature of the method of the invention, said heat which is extracted from the absorber system is withdrawn from the various stages at different temperatures, which makes the heat suitable for many practical purposes, for example, as a partial heat input for one or more organic Rankine cycles employing appropriately matched working fluid (or fluids).

In accordance with another aspect of the invention there is provided, for carrying out the method of the invention, a multiple stage absorber for effecting absorption of a gas (as herein defined) in a liquid (as herein defined) with maximal recovery of the heat of absorption, comprising:

a plurality of discrete, substantially identical stages, each defined by a fluid-tight chamber provided with a gas inlet and outlet at a lower and upper zone, respectively, of said chamber and with a liquid inlet and outlet at an upper and lower zone thereof, respectively; said gas inlet and/or said liquid inlet being equipped with gas or liquid dispersing means, respectively, for finely dispersing said gas and/or said liquid upon being introduced into said chamber; the gas and liquid inlets and outlets of each stage communicating in series with those of the adjacent stages so as to define a continuous liquid flow path from a first to a last stage and continuous gas flow path from said last to said first stage in counter-current to said liquid flow path;

a continuous conduit provided with liquid impelling means and adapted to withdraw liquid from the liquid outlet of said last stage and recirculate it through a part or all of the stages in an opposite sense to said liquid flow path so as to exchange heat with the fluids in these absorption stages through the walls of said conduit, and eventually to emerge from said first terminal stage; and heat exchange conduits in contact with the fluids in some or all of said absorption stages or with the fluids in their passage from each such stage to a consecutive one, adapted to effect heat transfer from said fluids to a coolant fluid.

In accordance with a preferred embodiment of the invention, the various stages of the absorber are disposed vertically one on top of the other and contained in a common vertical, cylindrical or prismatic housing, each stage being defined by corresponding portions of the vertical walls of the housing and by substantially horizontal partitions sealingly secured to the inner sides of said walls; the exception being the uppermost and lowermost stages which are defined at their upper and lower ends, respectively, by the top and bottom walls, respectively, of the housing itself. Preferably, the housing is provided on its entire outer side, or over a major part thereof, with a heat insulating sheath.

In the preferred arrangement described above, the liquid, namely the solvent or weak solution of the gas in the solvent, will be fed at the top of the uppermost stage and the liquid flow path will be established by the liquid descending by gravity from each stage to the next lower one, down to the lowermost stage from which the strong solution (of the gas in the solvent) is withdrawn to be recirculated, with the aid of a pump, upwards and through all the stages via a suitable continuous conduit, finally to be withdrawn from the uppermost stage as a high-enthalpy solution or mixture of gas and solution. The counter-current gas flow path in this preferred arrangement is established by introduction of the gas adjacent the bottom of the lowermost stage from which the gas ascends so as to pass through all the stages, intimately contacting the liquid descending therein in the opposite direction and being absorbed therein. An escape vent communicating with the uppermost stage is suitably provided at the top of the housing for venting non-condensible gases which may be present in the system and, possibly also residues of the unabsorbed gas.

It should be clear that the concept of the invention is not limited to the aforedescribed preferred configuration and mutual orientation of the absorber stages, but rather encompasses various other configurations and orientations of the stages in respect of each other. For example, each discrete stage or sub-group of stages, may be disposed in a separate, preferably heat-insulated, housing, the gas, liquid and recirculated strong solution being passed from each stage to the adjacent one by gravity, pressure differentials or by mechanical pumping means.

In order to provide for intimate contact between gas and liquid in each absorber stage, one or both the gas and liquid are finely dispersed upon their introduction into the stage with the aid of gas and/or liquid dispersing means provided for that purpose. Suitably, liquid dispersing means consist of a plurality of spray nozzles provided on liquid manifolds disposed adjacent the top of each stage. As gas distributing means there may be suitably used any of the conventional means known in the art, e.g. perforated gas manifold pipes extending horizontally adjacent the bottom of each stage, bubble caps submerged in liquid, etc.

In accordance with yet another preferred embodiment of the invention, each stage includes a layer of liquid confined between vertical partitions, one of which partitions extending throughout the height of the stage and comprising at least one liquid inlet aperture adjacent the bottom of the stage, whilst another vertical partition extending from the bottom of the stage up to only a fraction of the height of the stage thus serving as a weir for the liquid layer. As a consequence of this arrangement there is established in the liquid layer in each stage a substantially horizontal flow of liquid from said liquid inlet aperture in the one vertical partition towards the other vertical partition which acts as a weir and over which the liquid cascades downwards to the next lower stage. The space above the liquid level in each stage will be occupied by the gas (hereinafter "the gas space"). Preferably, and further in accordance with this embodiment, the gas inlet and distribution means are incorporated in the horizontal partitions defining the bottom of each stage and carrying the aforementioned liquid layer in the stage. These gas inlet and distribution means consist of apertures perforated in said horizontal partitions and having suitable shape and dimensions so as to facilitate entry and dispersion of gas from the gas space of each stage into the horizontally flowing liquid layer of the adjacent upper stage without impeding said horizontal liquid flow while at the same time resisting escape of liquid through the apertures to the next lower stage. This can be achieved, e.g., in the manner disclosed by A. Kogan in Israel Patent Specification No. 28707, that is by forming the apertures with a tapering, conical or bell shape and/or orienting the apertures with their axes inclined to the horizontal direction of flow of the liquid carried by the perforated partition. This arrangement however, is not limiting and, e.g. conventional bubble caps can be used to this end.

According to a further aspect of the present invention there is provided an energy conversion process comprising the steps of:

(a) distilling a solution of a gas (as herein defined) in a solvent (as herein defined) in a distillation column so as to produce a relatively pure solute gas leaving behind a relatively dilute solution;

(b) withdrawing said relatively dilute solution from a lower portion of the column and the solute gas from an upper portion of the column;

(c) passing the solute gas and the dilute solution in indirect heat exchange with each other so as to increase the enthalpy of the solute gas;

(d) passing the solute gas of increased enthalpy through power producing means so as to produce useful work and withdrawing from said power producing means said solute gas at reduced enthalpy;

(e) passing said dilute solution from step (c) through pressure reducing means;

(f) passing said dilute solution from step (e) and said solute gas from step (d) under conditions of reduced temperature and pressure and in respectively opposite directions into a multiple stage absorber through a plurality of discrete stages in each of which intimate contact is established between the gas and the solvent or solution so as to form a relatively concentrated solution under conditions of heat generation;

(g) withdrawing the relatively concentrated solution from a lower portion of the absorber, increasing its pressure by pumping means and recirculating at least a portion thereof via a continuous conduit counter-current to the flow of the weak solution and co-currently with the flow of said gas, through some or all of the stages so that heat is extracted from some or all of said stages by indirect heat exchange between the fluids in these stages and said recirculated relatively concentrated solution, whereby a substantial proportion of the heat of absorption generated in said stages is transferred to said relatively concentrated solution which emerges from said conduit as a high-enthalpy solution or mixture of solution and gas;

(h) extracting additional amounts of heat from some or all of said stages by indirect heat exchange between the fluids in those stages and a coolant fluid or fluids being passed through some or all of said stages; and (i) returning said high-enthalpy concentrated solution or mixture of solution and gas, from said absorber to said column at a level in the column corresponding to the concentration and state of the returning solution.

In this way it is ensured that, on the one hand, heat is constantly removed and recuperated from the absorber (by the circulating concentrated solution) thus facilitating the continuous absorption process and, on the other hand, the concentrated solution which is raised to an elevated temperature by the heat of absorption is returned to the distillation column thus closing the cycle. The fact that the column is being continuously fed with the preheated, concentrated solution inevitably reduces very considerably the required external heat input to the column and this external heat input is suitably modulated so as to ensure that the temperature and pressure in the column remain within practical limits.

If necessary and desirable, the solute gas can undergo a further increase in enthalpy before being passed to the power producing means by heating by means of an external heat source, preferably common to the column. On the other hand the dilute solution can, prior to introduction into the absorber, undergo further heat exchange, this time with the concentrated solution emerging from the absorber to which it transfers heat.

The pressure reducing means in step (e) above may be, for example, a turbine operatively coupled with the pump of step (g) above, thus contributing to the required pumping energy.

Preferably reflux is effected by passing the solute gas emerging from the column through a rectifier chamber in heat exchange with the relatively concentrated solution (emerging from the lower portion of the absorber) prior to its recirculation through the stages of the absorber via said continuous conduit (cf. step (g) above), the condensate formed in the rectifier being returned to the column as reflux.

Alternatively and preferably, refluxing is effected by directing a portion of the solute gas emerging from the column (preferably after undergoing a preliminary increase in enthalpy by heat exchange with dilute solution removed from the column and/or with an external heat source) to an auxiliary power producing means so as to produce useful work, condensing the solute gas withdrawn from the auxiliary power producing means and returning the condensed solute gas to the column as reflux.

BRIEF DESCRIPTION OF THE DRAWINGS

The invention will now be further described in detail with reference to the accompanying non-limiting drawings which illustrate, by way of example, various embodiments of the invention and in which.

GENERAL DESCRIPTION

Figure 1:
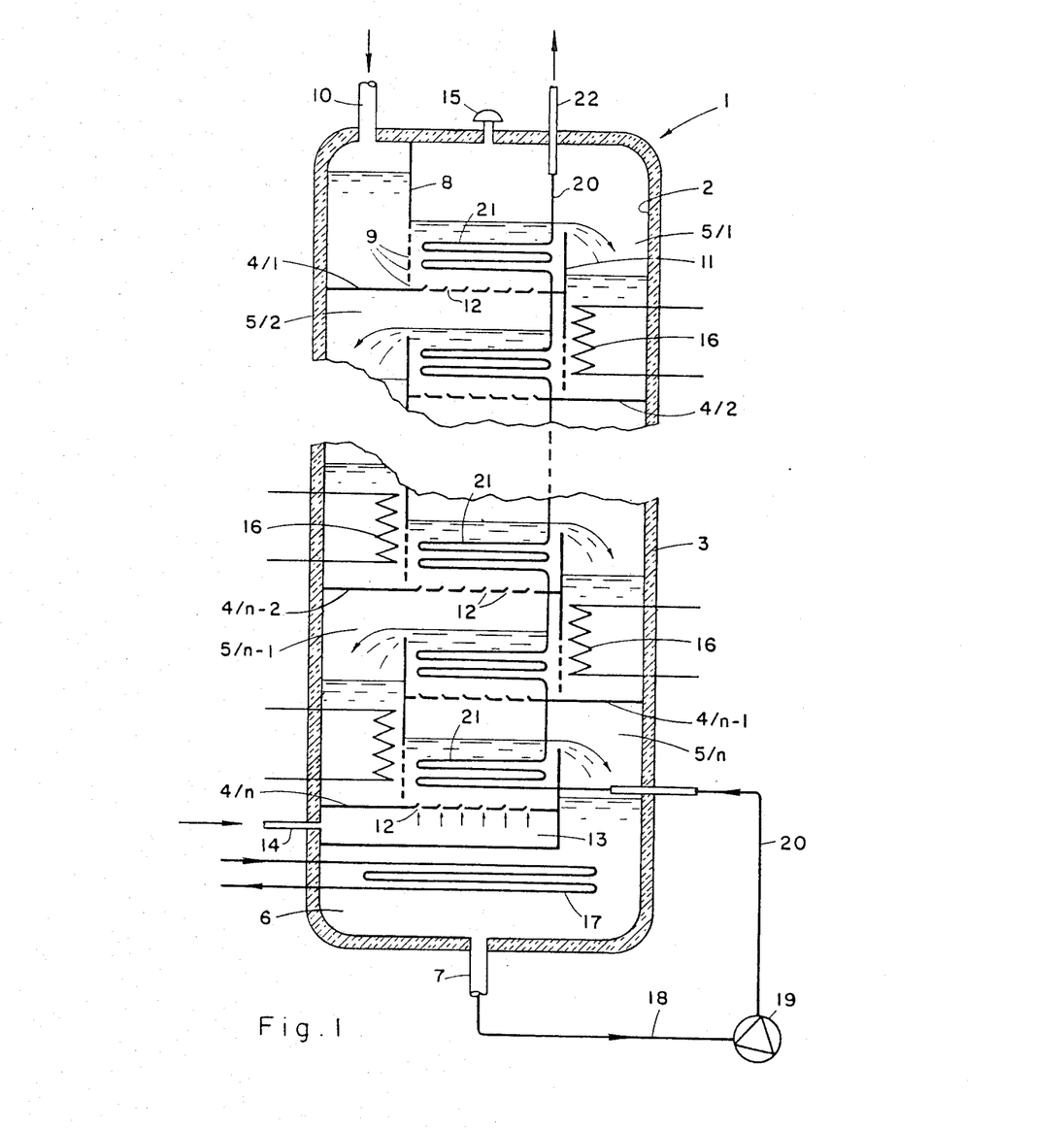
FIG. 1 is a schematic longitudinal cross-sectional view of a multi-stage absorber in accordance with one embodiment of the invention.

As seen in FIG. 1 a multi-stage absorber, generally designated 1, is constituted by a vertically disposed, elongated housing 2 provided over its entire outer surface with a heat insulating sheath 3. Housing 2 is subdivided by horizontal partitions 4/1, 4/2 ... 4/n-1 and 4/n, to form a plurality of discrete stages 5/1 to 5/n. At the bottom end of the housing 2 a strong solution collector 6 is defined between the lowermost stage 5n and the bottom wall of the housing 2, this strong solution collector opening onto a strong solution outlet 7. Each stage 5/1 to 5/n comprises a first vertical partition 8 (indexed only in the first stage 5/1) sealingly secured to the upper and lower horizontal walls of the stage and provided at its lower part with at least one liquid inlet aperture 9. Said first vertical partitions 8 are spaced apart from the adjacent inner walls of the housing 2. In the uppermost first stage 5/1 said space, between the first vertical partition 8 and the inner wall of the housing, communicates with a liquid inlet 10. Each stage further comprises a second vertical partition 11 (indexed only in the uppermost stage 5/1) sealingly secured to the bottom wall of the stage (i.e. to the horizontal partition 4/1) and extending upwards to only a part of the height of the stage.

As can also be clearly seen in FIG. 1, horizontal partitions 4/1 to 4/n are perforated to form a plurality of gas inlet apertures 12 in the area of the horizontal partition comprised between said first and second vertical partitions 8 and 11. It is further schematically shown in FIG. 1 that the longitudinal axes of the apertures 12 are inclined at an angle to the horizontal direction of flow of liquid in each stage. Gas inlet apertures 12 in the bottom wall 4/n of the lowermost stage 5/n communicate with a gas inlet manifold 13 which in turn communicates with a gas inlet 14 in the wall of housing 2. A gas escape valve (or vent) 15 is provided at the top of housing 2, communicating with the upper space of the first stage 5/1.

Indirect heat exchanger tubes 16 are provided in each stage 5/2 to 5/n, i.e. except for the first stage 5/1, for the circulation therein of a coolant fluid. Similarly, heat exchanger tubes 17 are provided in the strong solution collector 6 at the bottom of the housing 2. A conduit 18 connects the strong solution outlet 7 with a pump 19 adapted to impel the strong solution through a continuous conduit 20 passing upwards through all the stages 4/n to 4/1 and comprising heat exchange coils 21 located in the lower part of each stage. The upper end of conduit 20 emerges from the housing 2 as product outlet 22.

The operation of the multi-stage absorber 1 in accordance with the embodiment shown in FIG. 1 is as follows: solvent or a weak solution of the gas in the solvent is introduced through liquid inlet 10 into the space between vertical partition 8 and the inner wall of the housing 2 in the first stage 5/1 so as to form a column of liquid in that space. The liquid flows through liquid inlet (or inlets) 9 in the vertical partition 8 into the interior of stage 5/1 forming a liquid layer therein up to the height of the second vertical partition 11 which acts as a weir. A horizontal flow of liquid is thus established in stage 5/1 from left to right, the liquid overflowing the weir 11, cascading down to the next lower stage 5/2 and accumulating in the space between the first vertical partition 8 of said stage and the inner wall of the housing 2. In this second stage 5/2 the horizontal flow of liquid is from right to left as shown in FIG. 1. This process is repeated until the liquid reaches the lowermost stage 5/n from which it flows to and is collected in the strong solution collector 6. In the course of the tortuous downward flow path of the liquid in the absorber 1 the liquid comes in each stage into intimate contact with a counterflow of the gas which is introduced into the absorber via gas inlet 14 and gas inlet manifold 13 wherefrom the gas ascends by its own pressure through the gas inlet apertures 12 into the liquid layer in stage 5/n, being partially absorbed therein. The remainder of the gas which was not absorbed in stage 5/n accumulates in the gas space above the liquid in that stage, wherefrom it passes through apertures 12 in horizontal partition 4/n-1 into the next upper stage 5/n-1 and so forth until the uppermost stage 5/1 is reached. Any remaining unabsorbed gas and other non-condensible gases which may be present are released from the uppermost stage 5/1 through the escape valve 15.

The strong solution is withdrawn from the collector 6 via outlet 7 into conduit 18 and impelled by the pump 19 through conduit 20, as described above, so as to pass all or part of the stages 4/n to 4/1 in counter-current to the general flow of liquid in these stages and in indirect heat exchange relationship therewith by means of the heat exchanger coils 21. In the course of the passage of the strong solution through conduit 20 it accumulates heat from the liquid in each stage and as a consequence the temperature of the strong solution inside conduit 20 rises steadily. Eventually the strong solution may even start to boil at some intermediate point along the conduit 20. A high-enthalpy strong solution or mixture of gas and strong solution is thus obtained from outlet 22.

The balance of the heat of absorption beyond that which is transferred to the strong solution in conduit 20 can be extracted from the system by indirect heat exchange with a coolant fluid being passed through some or all of the heat exchanger pipes 16, as necessary for controlling the temperature of the liquid in the stages. A part of the heat content of the strong solution which, after leaving the lowermost stage 5/n accumulates in the strong solution collector 6, is similarly withdrawn by indirect heat exchange with the heat exchanger pipe 17. The coolant flowing through heat exchanger pipes 16 and 17 may be used in another part of the system or in a secondary energy conversion cycle.

Figure 2:
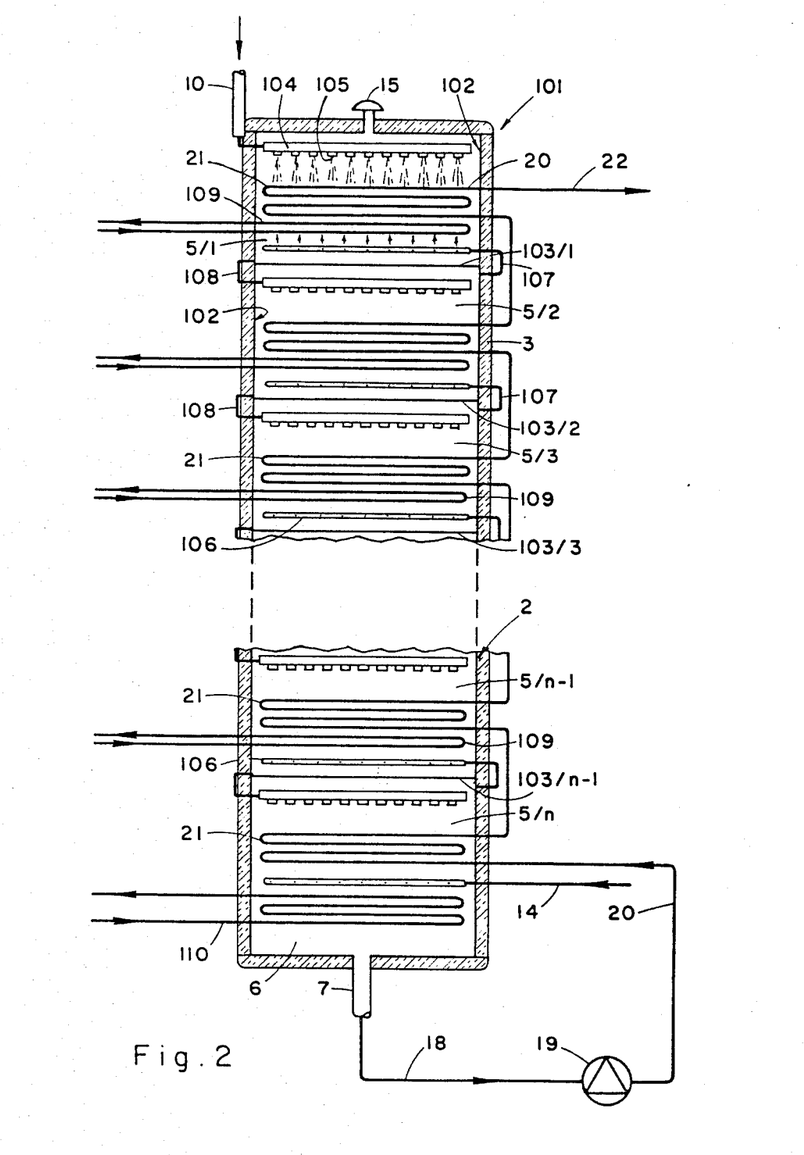
FIG. 2 is a schematic longitudinal cross-sectional view of another embodiment of a multi-stage absorber in accordance with the invention.

As can be seen in FIG. 2 a multi-stage absorber in accordance with another embodiment of the invention is generally designated as 101 and comprises the following components which correspond with those in FIG. 1 and are designated by the same reference numerals: a prismatic or cylindrical vertical housing 2 with an outer heat insulating sheath 3, a liquid inlet 10, a gas inlet 14, gas escape valve 15, strong solution outlet 7 communicating with conduit 18, pump 19 and continuous conduit 20 comprising exchanger coils 21 and terminating at a product outlet 22. In accordance with the embodiment of FIG. 2 the stages 5/1 to 5/n are defined by inner wall 102 of the housing 2 and horizontal partitions 103/1 to 103/n-1 forming together with the vertical partitions 102 a fluid-tight space in each stage. Each stage is provided adjacent its top with one or more liquid inlet manifolds 104 comprising a plurality of spray nozzles 105. Each stage is provided at its lower zone with a gas inlet manifold 106 consisting of one or more perforated pipes communicating via conduits 107 with the gas space above the liquid inlet manifold 104 of the adjacent lower stage.

The liquid inlet manifold 104 of the uppermost stage 5/1 communicates with the liquid inlet 10 of the absorber 101, whereas liquid manifolds 104 of the subsequent stages 5/2 to 5/n communicate by means of conduits 108 with the adjacent upper stage at a point adjacent the bottom thereof (i.e. adjacent the horizontal partitions 103/1 to 103/n-1). Each stage 5/1 to 5/n-1 that is with the exception of the lowermost stage 5/n, further comprises heat exchanger tubes 109 conveniently located below the heat exchanger coils 21 and above the gas inlet manifold 106, and adapted to circulate therein a coolant fluid. In the lowermost stage 5/n a similar heat exchanger tube 110 is located underneath the gas inlet manifold 106 of that stage, i.e. in the space between said gas inlet manifold and the bottom wall of the housing 2, which space serves in this embodiment of the invention as a strong solution collector 6.

The operation of the multi-stage absorber 101 illustrated in FIG. 2 is generally similar to that of absorber 1 in FIG. 1, as explained above in detail. The main difference resides in that in the absorber of FIG. 2 both the liquid and the gas introduced into each stage are dispersed with respect to each other. The liquid injected as a fine spray through the spray nozzles 105 at the top of each stage impinges upon the heat exchanger tubes 22 forming a liquid film on the surfaces of the tubes and dripping downwards over the heat exchanger tubes 109 to the bottom of the stage. In the course of its descent through the stage the liquid, in the form of a fine spray and of descending films and droplets, meets the ascending flow of the gas which enters the lower part of the stage through the gas inlet perforations in the gas inlet manifold 106. The liquid reaching the bottom of each stage, i.e. the horizontal partitions 103, passes through a conduit 108 into the liquid inlet manifold 104 of the next lower stage. The energy required in order to overcome pressure differentials between two consecutive stages and to force the liquid through spray nozzles 105 of the next stage may be provided either by gravity or by auxiliary pumps included in conduit 108. In the embodiment shown in FIG. 2 the first alternative is resorted to, but it should be made clear that since FIG. 2 is merely a schematic representation, the heights of conduits 108 as shown in FIG. 2 do not necessarily represent the actual dimensions required in order to provide for an adequate head of liquid in each conduit 108. Thus, if the use of pumps in conduits 108 is to be avoided, it may be necessary to provide for larger vertical displacements between adjacent stages.

Figure 3:
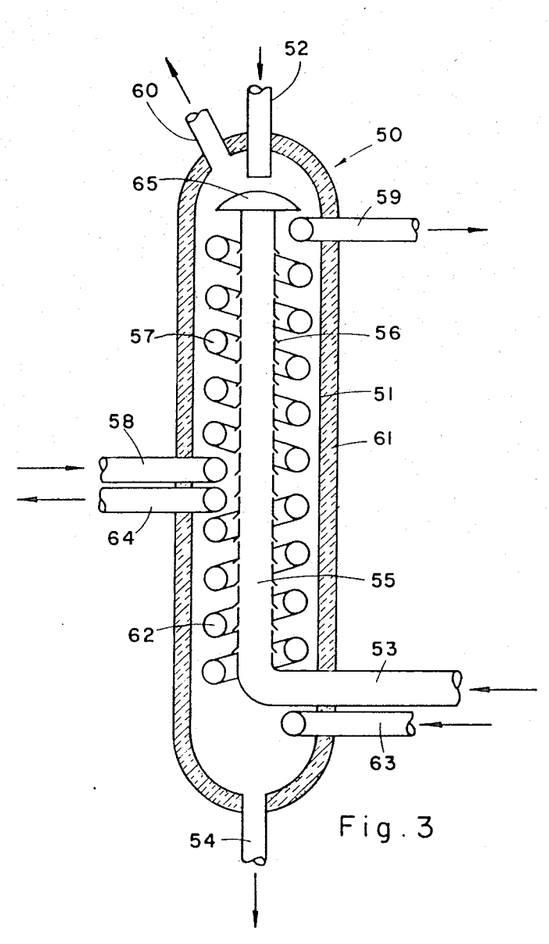
FIG. 3 is a schematic longitudinal cross-sectional view of a single stage of an absorber in accordance with yet another embodiment of the invention.

In accordance with a further embodiment of the absorber in accordance with the invention, as illustrated in FIG. 3, each single stage of a multi-stage absorber is generally designated 50 and consists of a cylindrical housing 51 provided with an external thermal insulating shield 61, a liquid inlet 52, a gas inlet 53, a gas outlet 60 and a liquid mixture outlet 54. Gas inlet 53 communicates with a gas inlet manifold 55 consisting of an elongated perforated tube, vertically disposed within the housing 51 coaxially therewith and extending substantially throughout its entire length. The perforations 56 of the gas inlet manifold 55 have their axes inclined at an acute angle to the vertical direction so as to facilitate entry of the gas from the interior of the inlet manifold 55 into the surrounding liquid which flows in the downward direction and to prevent said liquid from entering the interior of the gas inlet manifold 55. The top end of the gas inlet manifold is sealed and fitted with a liquid distributing cap 65 having a dome-shaped upper surface.

A first spiral conduit 57 for recirculation of the strong solution from a subsequent stage, extends from a strong solution inlet 58 to a strong solution outlet 59, surrounding the gas inlet manifold 55 throughout an upper part of its length. The outer diameter of said liquid distributing cap 65 corresponds with the diameter of the loops of the spiral conduit 57 so that the liquid which enters the housing 51 through liquid inlet 52, spreads over the spherical upper surface of cap 65 and descends over the lower edge thereof as an annular film, is directed towards the ridge of the upmost loop of spiral conduit 57.

A second spiral conduit 62 for circulation therein of a coolant fluid extends between a coolant fluid inlet 63 and outlet 64 surrounding gas inlet manifold 55 throughout a lower part of its length.

Figure 4:
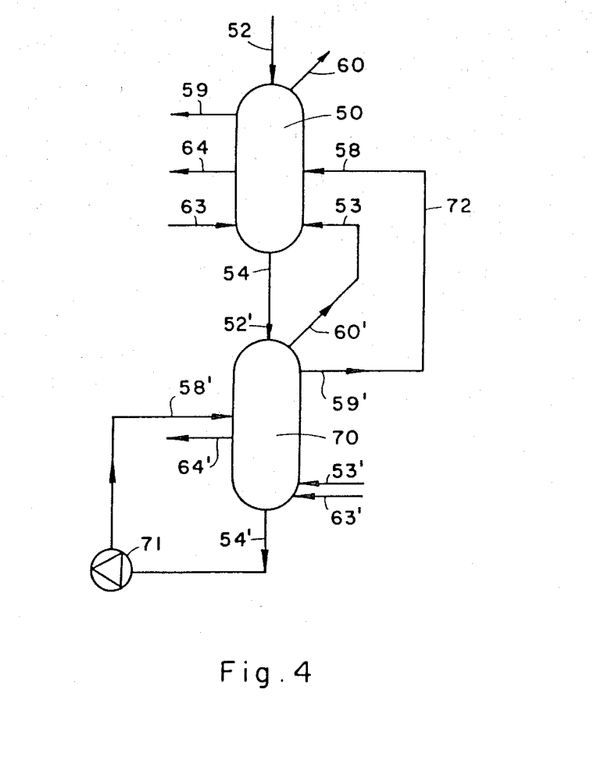
FIG. 4 is a schematic flow diagram illustrating the interconnection of two adjacent stages of an absorber in accordance with the embodiment of FIG. 3.

The manner in which a plurality of absorber stages of the type shown in FIG. 3 are interconnected in operation, is schematically represented in FIG. 4 showing two consecutive stages 50 and 70 each indentical with the one represented in FIG. 3. The various gas, liquid, strong solution and coolant fluid inlets and outlets in stage 50 are indexed by the same reference numerals used in FIG. 3, whereas the corresponding components of stage 70 in FIG. 4 are designated by corresponding reference numerals to which a prime (') was added. Stage 70 in FIG. 4 is the last stage in the liquid flow path corresponding with stage 5/n in FIGS. 1 and 2. Also shown in FIG. 4 are pump 71 for recirculating the strong solution emerging from the strong solution outlet 54' of stage 70 through the spiral conduit 57 (in FIG. 3) of stage 70, strong solution outlet 59' and inlet 58 of stage 50, the spiral conduit 57 of stage 50 and out of strong solution oulet 59 of that stage. Conduit 72 connects the strong solution outlet 59' with inlet 58. The liquid emerging from stage 50 through liquid outlet 54 and passing into the top of stage 70 via the liquid inlet 52' is propelled by gravity if, as shown in FIG. 4, successive stages are vertically oriented one above the other. Otherwise auxiliary pumps may be provided for passing the liquid from each stage to the next one.

The operation of the multi-stage absorber comprised of discrete stages 50 as illustrated in FIG. 3 is generally similar to that of the embodiments illustrated in FIGS. 1 and 2 and should be clear from the flow diagram in FIG. 4.

As stated above, it is the main object of the method and the apparatus according to the present invention, to recover as much as possible of the heat of absorption generated during the absorption of the gas in the solvent. This is accomplished in accordance with the present invention by conducting the absorption process in a series of consecutive stages, under conditions as close as possible to thermodynamically reversible conditions.

The heat recovered by the recirculating strong solution in a multi-stage absorber may be expressed by a heat recovery factor $W_R$ defined as follows:

$$W_R = \frac{\sum\limits_{i=1}^{n} Q_{Ri}}{\sum\limits_{i=1}^{n} Q_i} \qquad (1)$$

where $Q_i$ is the amount of heat liberated during the absorption process in each stage i;

and $Q_{Ri}$ is the portion of $Q_i$ that is recuperated by the strong solution recirculated through the stage i.

It is inherent to the method according to the present invention that $Q_{Ri}$ represents a very high fraction of $Q_i$. $Q_{Ri}$ will depend on the number of stages in the absorber, the relative position of the stage i in the absorber, the pressure $P_A$ of the gas entering stage n of the absorber, the pressure $P_R$ of the strong solution which is recirculated through the absorber in order to recuperate the heat and the concentration of the strong solution leaving the absorber.

The absorber heat recovery factor $W_R$ can be calculated theoretically from the mass and energy balance in each stage as follows:

Let:
- $L_i$, $h_i$ and $x_i$ be the mass, specific enthalpy and concentration, respectively, of the absorbing liquid leaving stage i;
- $G_i$, $H_i$ and $y_i$—the mass, specific enthalpy and concentration, respectively, of gas leaving stage i;
- and $Q_i$—the amount of heat liberated during the absorption process in stage i, as already defined above;

then a mass balance for the solution and for one component of the solution over the first i stages of absorption yields $$L_i = L_o - G_1 + G_{i+1} \quad (2)$$

$$G_{i+l} = \frac{l}{y_{i+l} - x_i} [(x_i - x_o)L_o + (y_l - x_i)G_l] \quad (3)$$

and an energy balance for the $i^{th}$ stage of absorption gives $$Q_i = h_o L_o - H_1 G_1 + H_{i+1} G_{i+1} - h_i L_i - \sum_{i=1}^{n-1} Q_i \quad (4)$$

On the basis of equations (2) to (4) above, $W_R$ values in an ammonia/water system at a proportion of 1:1 by weight, were calculated for an absorber pressure $P_A$ of 60 PSIA and recirculated strong solution pressures $P_R$ of 200, 300 and 400 PSIA. The $W_R$ values obtained are shown in the following Table I.

TABLE I

| Total number of stages n | $W_R$ at $P_R$ = 200 PSIA | $W_R$ at $P_R$ = 300 PSIA | $W_R$ at $P_R$ = 400 PSIA |
|---|---|---|---|
| 4 | 0.421 | 0.376 | 0.376 |
| 8 | 0.500 | 0.469 | 0.455 |
| 12 | 0.547 | 0.507 | 0.485 |
| 16 | 0.564 | 0.523 | 0.505 |
| 20 | 0.575 | 0.530 | 0.512 |
| 24 | 0.580 | 0.535 | 0.519 |
| 28 | 0.587 | 0.536 | 0.524 |

It follows from Table I that increasing the number of stages, up to a certain value of n results in a substantive increase of $W_R$, i.e. a substantive contribution to the heat recuperation by the strong solution.

Figure 5:
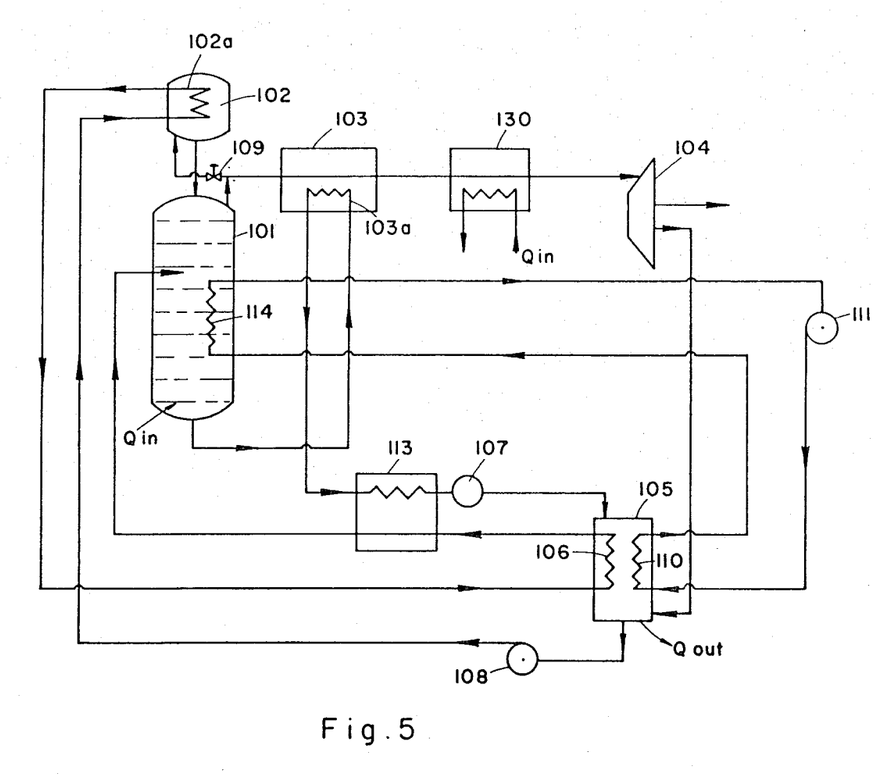
FIGS. 5 through 7 are respective schematic representations of differing embodiments of energy conversion processes in accordance with the present invention.
Figure 6:
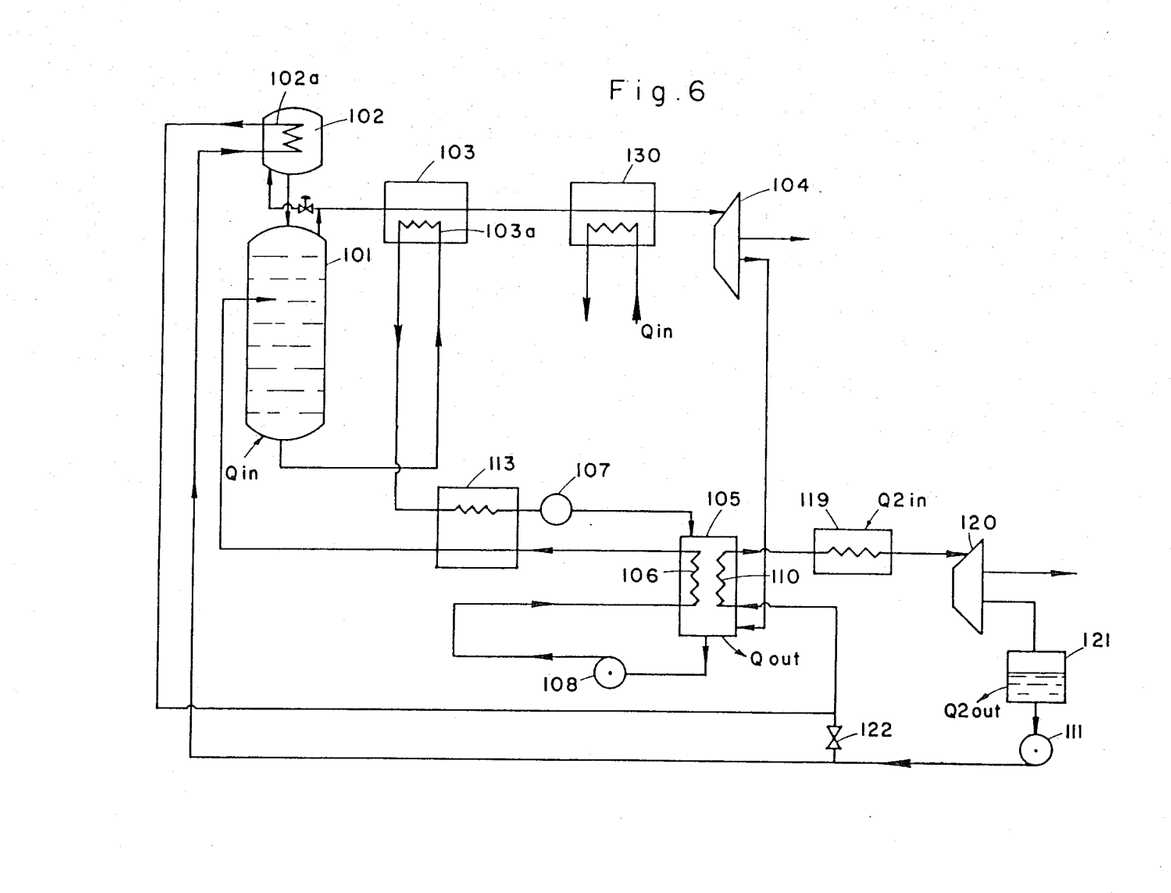
Figure 7:
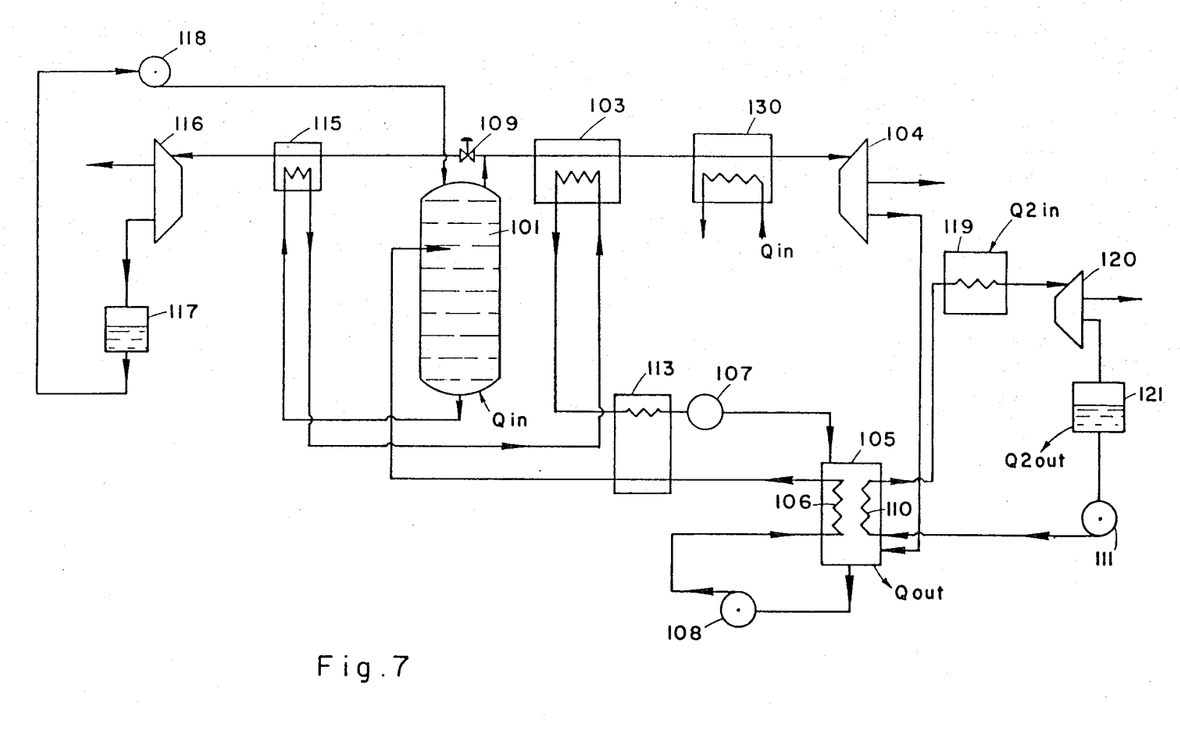

Various embodiments of energy conversion processes in accordance with the present invention are schematically illustrated in FIGS. 5 to 7 of the accompanying drawings.

As seen in FIG. 5 of the drawings the installation for carrying out the energy conversion process in accordance with one embodiment of the present invention comprises a distillation column 101, a rectifier 102, a rectifier coil 102a, a first heat exchanger 103, a second heat exchanger 113, heat exchanger coils 103a and 114, a superheater 130, a turbine 104, an absorber 105, absorber heat exchanger tubes 106 and 110, an expansion device 107, a first and second pumps 108 and 111, and a control valve 109.

The column 101, which is provided with an external heat source schematically indicated by the arrow $Q_{in}$ is charged with a concentrated solution of solute gas in a solvent liquid (the solute gas having a lower vaporization temperature than that of the solvent liquid), a suitable solution being a concentrated aqueous ammonia solution. With the application of heat, desorption of the solute gas takes place and the desorbed solute gas, together with a certain amount of vaporized solvent, rises to the upper regions of the column 101. A part of this gas mixture passes into the rectifier 102. The residual dilute solution accumulates at the lower portion of the column 101 at an elevated temperature. The solvent/solute vapor mixture in the rectifier 102, in heat exchange contact with the rectifier coil 102a through which flows a cooler concentrated solution (as explained below), undergoes cooling with the consequence that the vaporized solvent component condenses, returning as a reflux to the column. The reflux ratio is determined by the control valve 109. Relatively pure solute gas flows through the first heat exchanger 103 and undergoes heat exchange with hot dilute solution which passes from the lower portion of the column through the heat exchanger coil 103a. The heat exchanger 103 serves as an effective superheater for the solute gas which emerges therefrom and is further superheated by an external heat source in superheater 130. The superheated solute gas then passes to the turbine 104 where it performs useful work.

The dilute solution, now somewhat cooled, emerging from the first heat exchanger 103 is subjected to further heat exchange in the second heat exchanger 113 with the concentrated solution emerging from the heat exchanger tubes 106 in the absorber 105. The dilute solution then passes through the expansion device 107, in which its pressure is substantially reduced, and passes therefrom into the upper portion of the multiple stage absorber 105. Solute gas which emerges from the turbine 104 at substantially reduced temperature and pressure is passed into a lower portion of the absorber 105.

The counter-flowing dilute solution and solute gas come into contact in the absorber 105 and a stage-wise process of absorption of the gas by the solution takes place with consequent generation of heat of absorption which is partially removed by heat exchanger tubes 106 and 110. Excess heat of absorption is removed from the concentrated solution in the lower portion of absorber 105 ($Q_{out}$). The concentrated solution is passed from the lower portion of the absorber 105 by a first pump 108 through the rectifier coil 102a. Here, the concentrated solution undergoes heat exchange with the mixed vapors in the rectifier 102 causing the condensation of the solvent vapors and itself undergoing an increase in temperature.

The concentrated solution is now introduced into the absorber 105 via the heat exchanger tubes 106 at a temperature less than the temperature generated by the heat of absorption in the absorber. The heat exchanger tubes 106 extend through some or all of the stages of the absorber 105, the walls of the tubes being in direct heat exchange contact with the concentrated solution forming in the absorber. In this way the concentrated solution passing through the heat exchanger tubes 106 removes a significant amount of the heat of absorption generated in the absorber and emerges from the absorber at a substantially elevated temperature. The concentrated solution is further heated by heat exchanger 113 before reintroduction into the column 101, at a level thereof corresponding to the concentration of the returning solution, its temperature and its relative phase distribution.

Additional amounts of heat are extracted from some or all the stages of the absorber 105 by indirect heat exchange with a coolant fluid which is passed through the heat exchanger tubes 110 in the absorber 105 by means of the second pump 111.

In the embodiment shown in FIG. 5 this amount of heat transferred to said coolant fluid is utilized within the system as an auxiliary heat input of the column 101. To this end the coolant fluid emerging from the heat exchanger tubes 110 is passed through the heat exchanger coils 114 in the column wherefrom it returns to the second pump 111.

In the installation shown schematically in FIG. 6, which corresponds generally with the one shown in FIG. 5, the heat generated in the absorber and transferred to the coolant fluid passing in the heat exchanger tubes 110, is utilized in a secondary energy conversion cycle, e.g. as the partial heat input of an organic Rankine cycle wherein said coolant fluid serves as the working fluid. As shown schematically in FIG. 6 this secondary Rankine cycle comprises, in addition to the heat exchanger tubes 110 and the pump 111, a heat exchanger 119, a turbine 120, a condenser 121 and a control valve 122. The working fluid in this cycle, after absorbing heat in the heat exchanger tubes 110 of the absorber undergoes further heating in the heat exchanger 119 by an outside heat source (Q2in in FIG. 6). The thus superheated working fluid is routed to the turbine 120 where it produces useful work and emerges for cooling and condensation in the condenser 121 from where it is pumped by pump 111 to the heat exchanger tubes 110 in the absorber 105.

The embodiment shown in FIG. 6 incorporates another modification of the installation of FIG. 5 in that the solvent/solute vapor mixture in the rectifier 102 undergoes heat exchange not with the cooler concentrated solution as in the embodiment of FIG. 5, but rather with the coolant fluid supplied by the pump 111 to the rectifier coil 102a, from where it returns to the heat exchanger tubes 110 in the absorber 105. Control valve 122 in the secondary organic Rankine cycle allows for the adjustment of the ratio of the amounts of coolant fluid which are routed to the rectifier coil 102a or directly recycled to heat exchanger tubes 110.

As indicated above, partial regulated reflux is employed, this being advantageous in order to ensure the maintenance of a required solution concentration and the required solute gas purity upon entry into the turbine. Alternatively reflux may be effected by the mixture of gases emerging from the column 101 performing work in a Rankine cycle, thereby being liquefied and returned to the column (the pump required for this purpose being merely required to raise the condensate to the column pressure). This alternative arrangement is illustrated in FIG. 7 of the drawings.

In the embodiment shown schematically in FIG. 7 of the drawings, instead of reflux being effected with the rectifier arrangement as shown in FIGS. 5 and 6, a portion (determined by the reflux ratio control valve 109) of the solute gas is routed via a heat exchanger 115 where it undergoes heating in heat exchange with hot dilute fluid flowing from the boiler 101 in series with the heat exchanger 103. The thus superheated solute gas passes to an auxiliary turbine 116 where it performs useful work and emerges for cooling and condensation in a condenser 117 from where it is pumped by a pump 118 for refluxing into the column 101. As can be seen, in this embodiment the concentrated solution emerging from the heat exchanger tubes 106 passes via heat exchanger 113 directly to column 101.

In the embodiment shown in FIG. 7 of the drawings the heat removed from the absorber 105 by the coolant fluid passed in heat exchanger tubes 110, is utilized in a secondary energy conversion cycle, as in the embodiment of FIG. 6.

In some of the embodiments described above (FIGS. 5 to 7) external heat sources are indicated both for the column 101 and in order to superheat the coolant fluid prior to its introduction into the turbine of the secondary energy conversion cycle. Differing heat sources can be used for these purposes. Thus if the installation is associated with a steam plant, steam can be used as a heat source in which case the hottest steam can be employed for the solute gas superheaters whilst lower temperature steam can be used as a heat source for the column 101.

We claim:

1. A method of effecting gradual absorption of a first fluid (herinafter "the gas") having a relatively low boiling point in a second fluid (hereinafter "the solvent") having a considerably higher boiling point than the gas, under conditions as close as possible to thermodynamically reversible conditions, with maximal recovery of the released heat of absorption, so as to obtain a high enthalpy solution or mixture of solution and gas at relatively high temperature and pressure; comprising the steps of:
    (a) passing a flow of the gas through a plurality of discrete stages from a first terminal stage to a second terminal stage and, in counter-current thereto, passing a flow of the solvent or a weak solution of the gas in the solvent through said stages from said second terminal stage to said first terminal stage, so as to establish in each of said stages an intimate contact between the gas and the solvent or said weak solution;
    (b) withdrawing a strong solution of the gas in the solvent from said first terminal stage and recirculating it through some or all of the stages counter-currently to the flow of the weak solution and co-currently with the flow of said gas via a continuous conduit comprising heat exchange tubes disposed in said stages;
    (c) dispersing the solvent or the weak solution of the gas in the solvent entering each stage by liquid spraying means suitably disposed with respect to said heat exchange tubes so as to form a film-like layer of said solvent or said weak solution on the outer surface of said heat exchange tubes, thereby to extract heat from some or all of said stages by indirect heat exchange through the walls of said tubes between said recirculated strong solution flowing therein and the liquid in said film-like layer;
    (d) extracting additional amounts of heat from some or all of said stages by indirect heat exchange between the fluids in those stages and a coolant fluid or fluids, the temperature of said coolant fluid or fluids being thus raised; and
    (e) withdrawing said recirculated strong solution from said second terminal stage as a high-enthalpy solution or mixture of solution and gas.

2. A method according to claim 1 wherein the heat withdrawn by transfer to said coolant fluid or fluids is utilized as the heat input of at least one secondary energy conversion process.

3. A method according to claim 4 wherein said heat is utilized in an organic Rankine cycle.

4. A method according to claim 1 wherein said gas is ammonia and said solvent is water.

5. A method according to claim 1 wherein said strong solution withdrawn from said first terminal stage is recirculated via said continuous conduit through all the stages.

6. A method according to claim 1 wherein said stages are arranged on top of each other in a substantially vertical array, said second terminal stage being topmost, and said flow of the solvent or weak solution of the gas in the solvent is effected by gravity.

7. A method according to claim 1 wherein said gas is a low enthalpy gas withdrawn from power producing means in a dual fluid energy conversion system and said high-enthalpy solution or mixture of solution and gas withdrawn from said second terminal stage is recycled, directly or indirectly, to a distillation column in said system.

8. A method according to claim 7, wherein the heat withdrawn by transfer to said coolant fluid or fluids is utilized within said energy conversion system.

9. A method according to claim 1 wherein said heat exchange tubes are disposed in said stages substantially horizontally and said liquid spraying means are disposed above said heat exchange tubes.

10. A multiple stage absorber for effecting absorption of a first fluid (hereinafter "the gas") having a relatively low boiling point in a second fluid (hereinafter "the solvent") having a considerably higher boiling point that the gas, with maximal recovery of the heat of absorption, comprising:

a plurality of discrete, substantially indentical stages, each defined by a fluid-tight chamber provided with a gas inlet and outlet at a lower and upper zone, respectively, of said chamber and with a liquid inlet and outlet at an upper and lower zone thereof, respectively; said gas inlet being equipped with gas dispersing means for finely dispersing said gas upon being introduced into said chamber; and said liquid inlet being equipped with liquid dispersing means consisting of a plurality of spray nozzles; the gas and liquid inlets and outlets of each stage communicating in series with those of the adjacent stages so as to define a continuous liquid flow path from a first to a last stage and a continuous gas flow path from said last to said first stage in counter current to said liquid flow path;

a continuous conduit comprising a plurality of portions formed of heat exchange tubes disposes in some or all of the stages, and liquid impelling means adapted to withdraw a strong solution of said gas in said solvent from the liquid outlet of said last stage and recirculate it through a part or all of the stages in an opposite sense to said liquid flow path, so as to exchange heat through the walls of said heat exchange tubes with the liquid which forms a film-like layer on the outer surface of said heat exchange tubes in these absorption stages; said strong solution eventually emerging from said first terminal stage; and heat exchange conduits suitably located in heat transfer contact with the fluids in some or all of said absorption stages either within said stages or in passage of said fluids from one such stage to a consecutive one, so as to effect heat transfer from said fluids to a coolant fluid circulating within said heat exchange conduits.

11. A multiple stage absorber according to claim 10, wherein said stages are disposed vertically one on top of the other, said first stage being topmost.

12. A multiple stage absorber according to claim 11, wherein all of said stages are contained in a common vertical housing of cylindrical or prismatic shape, each stage except for the uppermost and lowermost ones being defined by corresponding portions of the vertical walls of said housing and a pair of vertically spaced apart, substantially horizontal partitions sealingly secured to the inner sides of said walls.

13. A multiple stage absorber according to claim 12, wherein said housing is provided on its entire outer side or over a major part thereof with a heat insulating sheath.

14. A multiple stage absorber according to claim 10 wherein said gas dispersing means consist of a perforated gas manifold pipe or pipes.

15. A multiple stage absorber according to claim 10 when used for effecting absorption of ammonia in water.

16. A multiple stage absorber according to claim 10 wherein the gas fed to the multi-stage absorber is a low-enthalpy gas withdrawn from power producing means in a dual fluid energy conversion system and the recirculated strong solution withdrawn from said terminal stage of the multi-stage absorber is recycled, directly or indirectly, to a distillation column in said system.

17. A multiple stage absorber according to claim 10 wherein said heat exchange tubes are disposed in said stages substantially horizontally and said spray nozzles are provided on liquid manifolds disposed above said heat exchange tubes and adjacent the tops of said stages.

18. An energy conversion process comprising the steps of:

(a) distilling a solution of a first fluid (hereinafter "the gas") having a relatively low boiling point in a second fluid (hereinafter "the solvent") having a considerably higher boiling point that the gas, in a distillation column so as to produce a relatively pure solute gas leaving behind a relatively dilute solution;

(b) withdrawing said relatively dilute solution from a lower portion of said distillation column and the solute gas from an upper portion of the column;

(c) passing said solute gas and said dilute solution in indirect heat exchange with each other so as to increase the enthalpy of the solute gas;

(d) passing the solute gas of increased enthalpy though power producing means so as to produce useful work and withdrawing from said power producing means said solute gas at reduced enthalpy;

(e) passing said dilute solution from step (c) through pressure reducing means;

(f) passing said dilute solution from step (e) and said solute gas from step (d) under conditions of reduced temperature and pressure and in respectively opposite directions into a multiple stage absorber through a plurality of discrete stages in each of which intimate contact is established between the gas and the solvent or solution so as to form a relatively concentrated solution under conditions of heat generation;

(g) withdrawing the relatively concentrated solution from a first terminal stage of the absorber, increasing its pressure by pumping means and recirculating at least a portion thereof via a continuous conduit counter-currently to the flow of said dilute solution and co-currently with the flow of said gas, through some or all of the stages, thereby to extract heat from some or all of said stages by indirect heat exchange between the fluid in these stages and said recirculated relatively concentrated solution, whereby a substantial proportion of the heat of absorption generated in said stages is transferred to said relatively concentrated solution which emerges from a second terminal stage as a high-enthalpy solution or mixture of solution and gas;

(h) extracting additional amounts of heat from some or all of said stages by indirect heat exchange between the fluid in these stages and a coolant fluid or fluids being passed through some or all of said stages; and (i) returning said high-enthalpy concentrated solution or mixture of solution and gas, from said second terminal stage of said absorber to said distillation column at a level in the column corresponding to the concentration and state of the returning solution.

19. An energy conversion process according to claim 18 wherein a portion of the vaporized solute gas from step (b) is passed in indirect heat exchange with dilute solution removed from the column so as to increase its enthalpy, is then passed to an auxiliary power producing means so as to produce useful work and is then condensed and returned to the column as reflux.

20. An energy conversion process according to claim 18, wherein said relatively dilute solution from step (c) prior to its introduction into the absorber, is passed in indirect heat exchange with said concentrated solution from step (i) prior to its introduction into the column.

21. An energy conversion process according to claim 18, wherein step (f) is characterized in that the flow of the gas and the flow of the dilute solution are passed in counter-current through a plurality of discrete stages in each of which intimate contact is established between the gas and the solvent or solution; and in that heat is extracted from some or all of said stages by indirect heat exchange between the fluids in these stages and a strong solution of the gas in the solvent which is withdrawn from one terminal stage and recirculated via a continuous conduit counter-current to the flow of the weak solution and co-currently with the flow of said gas, through some or all of the stages so as to emerge from said conduit, after passing said stages, as a high-enthalpy solution or mixture of solution and gas; and additional amounts of heat are extracted from some or all of said stages by indirect heat exchange between the fluids in those stages and a coolant fluid or fluids being passed through part of all of said stages, the temperature of said coolant fluid being thus raised.

22. An energy conversion process according to claim 18 wherein said concentrated solution or mixture of solution and gas is passed in indirect heat exchange with vapors emerging from the upper portion of said column so as to cause the condensation and removal from said vapors of entrained solvent for return to the column as reflux.

23. An energy conversion process according to claim 18 wherein said solute gas from step (c) is subjected to further superheating by means of an external heat source prior to passing to said power producing means.

* * * * *